2,813,871
Patented Nov. 19, 1957

2,813,871

O-SYRINGOYL RESERPIC ACID ESTERS

Robert A. Lucas, Mendham, N. J., assignor to Ciba Pharmaceutical Products, Inc., Summit, N. J., a corporation of New Jersey No Drawing. Application July 27, 1954,
Serial No. 446,145

17 Claims. (Cl. 260—286)

The present invention relates to diesters of O-(O'-carboxy-syringoyl)-reserpic acid and more particularly to di-alkyl esters thereof, and to processes for their manufacture. Especially valuable are the di-lower alkyl esters of the O-(O'-carboxy-syringoyl)-reserpic acid, which in the form of free bases can be represented by the following formula:

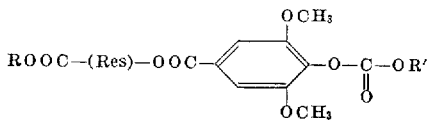

wherein R and R' stand for lower alkyl radicals, e. g. methyl, ethyl, propyl, butyl, isobutyl and the like, and "Res" stands for the divalent organic radical bound to the free hydroxyl group and carboxyl group in the reserpic acid.

Examples of esters coming within the scope of the present invention are: methyl O - (O' - carbomethoxy-syringoyl) - reserpate, methyl O - (O' - carbethoxy-syringoyl) - reserpate, methyl O - (O' - carbopropoxy-syringoyl) - reserpate, methyl O - (O' - carbobutoxy-syringoyl) - reserpate, methyl O - (O' - carbo - isobutoxy-syringoyl) - reserpate, and the corresponding ethyl O - (O' - carbethoxy - syringoyl) - reserpates. The invention also embraces the acid addition salts of the compounds, e. g. the nontoxic or therapeutically useful salts, such as organic and inorganic acid salts.

The novel esters are useful as hypotensive agents. Unlike reserpine which is methyl O - (3,4,5 - trimethoxy-benzoyl) - reserpate, the compounds, while possessing hypotensive activity like reserpine, lack sedative-hypnotic action or are only mildly sedative. Methyl O - (O'-carbethoxy-syringoyl) - reserpate is especially characterized by its high hypotensive activity and freedom from sedative action.

The novel compounds may be prepared by various procedures. According to one method, a reserpic acid ester having a free hydroxy group is converted into its ester with an O-carboxysyringic acid the O-carboxy group of which is esterified. Thus the reserpic acid ester may be reacted with an agent capable of introducing an esterified O-carboxy-syringoyl residue such as an O-carbalkoxy-syringoyl residue. Such agents are, for example, reactive functional acid derivatives of the esterified O-carboxy-syringic acids, especially halides, for example the chlorides. In this latter case the reaction can preferably be carried out in the presence of an acid acceptor, for example, pyridine.

According to an alternate procedure, an O-syringoyl-reserpic acid ester is converted into its ester with a carbonic acid monoester. Thus the O-syringoyl-reserpic acid ester may be reacted with an agent capable of introducing an esterified carboxy group, such as a reactive functional acid derivative of a carbonic acid monoester, for example, haloformate, such as a chloroformate, preferably in the presence of an acid acceptor.

Depending on the method of working, the novel esters are obtained in the form of the free bases or their salts. From the bases nontoxic or therapeutically useful salts can be obtained, such as for example that of hydrochloric acid, sulfuric acid, nitric acid, perchloric acid, phosphoric acid, acetic acid, propionic acid, lactic aid, oxalic acid, succinic acid, malic acid, tartaric acid, citric acid, ascorbic acid, methane sulfonic acid, ethane sulfonic acid, hydroxyethane sulfonic acid, benzoic acid, salicylic acid, p-aminosalicylic acid or toluene sulfonic acid, by reacting the bases with such acids.

The novel compounds can be made up into preparations suitable for enteral or parenteral administration, e. g. in the form of tablets, ampoules and other dosage unit forms. For this purpose any suitable pharmaceutical carrier or vehicle may be employed, e. g. water, gelatin, lactose, starch, magnesium stearate, talc, vegetable oils, benzyl alcohol, gums, polyalkylene glycols, petroleum jelly, cholesterol or other known carrier substances for medicaments.

The following examples will serve to illustrate the invention. In the examples the relationship of parts by weight to parts by volume is that of the gram to the milliliter.

Example 1

To a solution of 0.2 part by weight of methyl O-syringoyl-reserpate in 20 parts by volume of benzene and 2 parts by volume of pyridine were added 2 parts by volume of methyl chloroformate. The mixture was heated to reflux for 5 minutes and then evaporated in vacuo. There were added 25 parts by volume of water which caused the foamy solid that had formed to become granular. The granular product was filtered, washed with water and dissolved in 15 parts by volume of methanol. The solution was stirred with 0.3 part by weight of silver carbonate for 5 minutes, filtered and evaporated in vacuo. Recrystallization from 5 parts by volume of ethanol yielded crystalline methyl O-(O' - carbomethoxy - syringoyl) - reserpate, M. P. 231–232° C.

Example 2

One part by weight of methyl reserpate and 1.9 parts by weight of O-carbethoxy-syringoyl chloride were dissolved in 20 parts by volume of anhydrous pyridine and allowed to stand at 5° C. for 3 days. An equal volume of ice was then added, and the mixture evaporated to dryness in vacuo. The residue was dissolved in 50 parts by volume of chloroform and washed in succession with three 50 parts by volume portions of 2 percent sodium hydroxide solution and two 50 parts by volume portions of water. The chloroform solution was dried over sodium sulfate and evaporated to dryness. The residue was dissolved in 15 parts by volume of benzene and chromatographed on a 10 part by weight column of II–III grade alumina. Eluates of benzene, 90 benzene: 10 acetone, 80 benzene: 20 acetone, 60 benzene: 40 acetone, and acetone were removed. From the 90 benzene: 10 acetone eluate there was recovered crystalline methyl O - (O' - carbethoxy - syringoyl) - reserpate, M. P. 175–178° C., on crystallization from acetone.

Starting from ethyl reserpate instead of methyl reserpate and proceeding in the same manner ethyl O - (O'-carbethoxy - syringoyl) - reserpate can be obtained.

Example 3

To a solution of 0.2 part by volume of methyl O-syringoyl-reserpate in 20 parts by volume of benzene and 2 parts by volume of pyridine were added 2 parts by volume of propyl chloroformate. The mixture was refluxed for 5 minutes and after 30 minutes at room temperature evaporated in vacuo. The sticky residue became granular on addition of 25 parts by volume of water. The granular product was water washed and dissolved in methanol and stirred with 0.3 part by weight of silver carbonate for 5 minutes. The solution was filtered, evaporated in vacuo and the residue recrystallized from acetone-water yielding methyl O - (O'-carbopropoxy-syringoyl)-reserpate, M. 180–184° C.

*Example 4*

To a solution of 0.2 part by weight of methyl O-syringoyl reserpate in 20 parts by volume of benzene and 2 parts by volume of pyridine were added 2 parts by volume of butyl chloroformate. The mixture was refluxed for 5 minutes and after 30 minutes at room temperature evaporated in vacuo. The sticky residue became granular on addition of 25 parts by volume of water. The granular product was washed with water and dissolved in methanol, stirred with 0.3 part by weight of silver carbonate for 5 minutes and filtered. After evaporation of the solution in vacuo the residue was recrystallized from acetone-water yielding methyl O-(O'-carbobutoxy-syringoyl) - reserpate, M. P. 187–189° C.

*Example 5*

To a solution of 0.2 part by weight of methyl O-syringoyl-reserpate in 20 parts by volume of benzene and 2 parts by volume of pyridine were added 2 parts by volume of iso-butyl chloroformate. The mixture was heated at reflux temperature for 5 minutes and then evaporated in vacuo. The sticky residue was water washed and the resulting granular solid recrystallized from 2 parts by volume of ethanol. There was thus obtained crystalline methyl O-(O'-carbo-isobutoxy-syrnigoyl)-reserpate hydrochloride monohydrate, M. P. 224–225° C.

The hydrochloride may be converted to the free base by shaking a solution thereof in methanol for 5 minutes with silver carbonate. Filtration, evaporation to dryness and recrystallization from ethanol yields crystalline methyl O - (O' - carbo - isobutoxy - syringoyl) - resperate in the form of needles, M. P. 192–194° C.

In Examples 1 and 3 to 5, if instead of methyl O-syringoyl-reserpate there is employed ethyl O-syringoyl-reserpate, there may be obtained the following compounds:

Ethyl O-(O'-carbomethoxy-syringoyl)-reserpate
Ethyl O-(O'carbopropoxy-syringoyl)-reserpate
Ethyl O-(O'-carbobutoxy-syringoyl)-reserpate
Ethyl O-(O'-carbo-isobutoxy-syringoyl)-reserpate The methyl O-syringoyl-reserpate employed as a starting material in Examples 1 and 3 to 5 can be prepared as follows:

0.34 part by weight of methyl O-(O'-carbethoxy-syringoyl)-reserpate was dissolved in 100 parts by volume of 3 N alcoholic ammonia and allowed to stand at 5° C. for three days. The solution was concentrated in vacuo to dryness and the solid recrystallized from a small volume of anhydrous ethanol, yielding methyl, O-syringoyl-reserpate, M. P. 190–192° C.

The preparation of alkyl reserpates such as methyl and ethyl reserpate is described by Dorfman et al., Helv. Chim. Acta 37:59–75 (1954).

What is claimed is:

1. A member selected from the group consisting of lower alkyl O-(O'-carbalkoxy-syringoyl) reserpates and therapeutically active salts thereof.
2. An O-syringoyl reserpic acid ester.
3. Methyl O-syringoyl reserpate.
4. Ethyl O-syringoyl reserpate.
5. Di-lower alkyl esters of O-(O'-carboxy-syringoyl)-reserpic acid.
6. Methyl O-(O'-carbomethoxy-syringoyl)-reserpate.
7. Methyl O-(O'-carbethoxy-syringoyl)-reserpate.
8. Methyl O-(O'-carbopropoxy-syringoyl)-reserpate.
9. Methyl O-(O'-carbobutoxy-syringoyl)-reserpate.
10. Methyl O-(O'-carbo-isobutoxy-syringoyl)-reserpate.
11. A method which comprises the step of treating an alkyl O-syringoyl-reserpate with an alkyl chloroformate.
12. A method which comprises the step of treating an alkyl reserpate with an O-carbalkoxy-syringoyl chloride.
13. A method for preparing methyl O-(O'-carbethoxy-syringoyl)-reserpate which comprises the step of treating methyl O-syringoyl-reserpate with ethyl chloroformate.
14. A method for preparing methyl O-(O'-carbethoxy-syringoyl)-reserpate which comprises the step of reacting methyl reserpate with O-carbethoxy-syringoyl chloride.
15. A method for preparing methyl O-(O'-carbopropoxy-syringoyl)-reserpate which comprises the step of treating methyl O-syringoyl-reserpate with propyl chloroformate.
16. A method for preparing methyl O-(O'-carbobutoxy-syringoyl)-reserpate which comprises the step of treating methyl O-syringoyl-reserpate with butyl chloroformate.
17. A method for preparing methyl O-(O'-carboisobutoxy-syringoyl)-reserpate which comprises the step of treating methyl O-syringoyl-reserpate with iso-butyl-chloroformate.

References Cited in the file of this patent

Neuss et al.: J. Am. Chem. Soc., vol. 75, pp. 4870–71 (1953).

UNITED STATES PATENT OFFICE
CERTIFICATE OF CORRECTION

Patent No. 2,813,871

November 19, 1957

Robert A. Lucas

It is hereby certified that error appears in the printed specification of the above numbered patent requiring correction and that the said Letters Patent should read as corrected below.

Column 3, line 7, for "M. 180-184° C." read -- M. P. 180-184° C. --; column 4, line 6, after "methyl" strike out the comma; line 10, for "Chim. Acta 37" read -- Chim. Acta 37 --.

Signed and sealed this 27th day of May 1958.

(SEAL)
Attest:

KARL H. AXLINE
Attesting Officer

ROBERT C. WATSON
Commissioner of Patents